United States Patent [19]

Williams et al.

[11] Patent Number: 5,422,561
[45] Date of Patent: Jun. 6, 1995

[54] AUTOMATED VOLTAGE AND VAR CONTROL IN POWER TRANSMISSION AND DISTRIBUTION NETWORKS

[75] Inventors: Bradley R. Williams, Orange; Richard C. Krause, Diamond Bar; Bryan H. Pham, Cyprus; Dennis A. Eastman, Yorba Linda, all of Calif.

[73] Assignee: Southern California Edison Company, Rosemead, Calif.

[21] Appl. No.: 980,385

[22] Filed: Nov. 23, 1992

[51] Int. Cl.⁶ .................................................. G05F 1/70
[52] U.S. Cl. ...................................... 323/209; 307/31; 364/492; 323/210
[58] Field of Search .............. 323/205, 208, 209, 210, 323/211, 218; 307/31, 33; 364/492, 483, 571.01, 571.07, 153; G05F 1/70

[56] References Cited

U.S. PATENT DOCUMENTS

| | | | |
|---|---|---|---|
| 3,754,184 | 8/1973 | Stone | 323/102 |
| 4,234,843 | 11/1980 | Gyugyi et al. | 323/119 |
| 4,630,220 | 12/1986 | Peckingpaugh | 364/492 |
| 4,677,364 | 8/1987 | Williams et al. | 322/47 |
| 4,857,821 | 8/1989 | Takeda | 323/210 |
| 4,999,565 | 3/1991 | Nilsson | 323/210 |
| 5,099,190 | 3/1992 | Sato | 323/210 |
| 5,134,356 | 7/1992 | El-Sharkawi et al. | 323/211 |

Primary Examiner—Steven L. Stephan
Assistant Examiner—Adolf Berhane
Attorney, Agent, or Firm—Jeffrey G. Sheldon; Sheldon & Mak, Inc.

[57] ABSTRACT

Controlling a customer voltage and VAR flow in a power transmission and distribution system includes measuring first voltages in a power line directed to a first location related to customers. Both the customer voltage and the VAR flow for the network is determined in relation to the number of capacitors associated with the first location which are switched in or out of the network. The measured voltages are communicated to a voltage control. Voltage deviations of the measured first voltage are determined relative to a predetermined voltage range intended to be present at the first locations. Switching the capacitor means into or out of the network is determined by the voltage control in accordance with a voltage rise table. A VAR flow controller is responsive to the voltage at the first locations, the effect of the VAR generation by the capacitors and the change of VAR generation by the capacitor. A decrease in voltage at the customers saves energy use. A decrease in the VAR generated upstream of the customer results in greater efficiency of energy generation.

76 Claims, 8 Drawing Sheets

AUTOMATED VOLTAGE AND VAR CONTROL IN POWER TRANSMISSION AND DISTRIBUTION NETWORKS

BACKGROUND

Control of power distribution networks to minimize customer voltage and system VAR flow provides dramatic savings of energy.

This invention relates to power transmission and distribution networks. In particular, the invention relates to a system for controlling the voltage and VARs in a distribution network so as to achieve significant overall reduction of customer voltage and reduction of VAR flow. More particularly, the invention is directed to a network operated with overall energy savings for customers and an efficient power transmission and distribution network.

Power Transmission and Distribution Systems

An electric power transmission and distribution system is generally configured as follows. High voltage 500 kV and 230 kV transmission lines transport bulk power from major generation sources to areas of use. Transmission substations terminate high voltage transmission lines using transformers to reduce the voltage to subtransmission levels of 115 kV or 66 kV. Subtransmission lines transport power from transmission substations to large industrial customers or to distribution substations. The distribution substations reduce 115 kV or 66 kV input voltages to 33 kV, 12 kV, 4 kV, or other distribution voltages. Distribution lines, at between 16 kV to 4 kV, or at other distribution voltage, transmit electricity to transformers which reduce the voltage to the levels required by customers. The distribution voltage can, in some situations be 16 kV or as low as 4 kV. This distribution voltage is also known as the primary circuit voltage.

The primary circuit voltage is transformed down to a lower secondary voltage suitable for use to operate customer loads. Such lower voltages are normally in the range of about 500 volts to 120 volts, and can be a single phase or three-phase voltage. The general residential customer service voltage level in the United States is nominally about 120/240 volts single phase for most purposes. For commercial purposes, this secondary voltage can be nominally 120 volts, 208 volts, 240 volts, 277 volts or 480 volts, single phase or three phase.

Voltages in a network vary from nominal voltage throughout the day. For end user voltages intended to be nominally 120 volts, the variation can usually be in a range of between 114 volts and 126 volts. The actual voltage depends on many circumstances in the network including, time of day, customer load, system, and power generation in the network.

It is known that energy is conserved, namely there is less need to generate power, if the overall secondary voltage can be reduced to the lower portion of the predetermined voltage range, namely 114 volts to 126 volts. The current preferred mandated restrictive range in California is between 114 volts to 120 volts, so as to obtain energy conservation. Many distribution systems cannot easily meet these standards, without the replacement or rearrangement of existing power distribution facilities in the power distribution network. In some cases, it is less cost effective to reduce the voltage to the more restrictive range because of the additional expenditure involved in changing expensive components in the power distribution network.

Capacitors in Networks

Capacitors are used in power distribution networks to control voltage and supply VARs in the network. Currently, capacitors are used in networks and are mechanically switched into or out of the network under appropriate circumstances.

Many capacitors have an associated controller which can operate within a bandwidth. As such, a capacitor is switched out of the system when a voltage reaches an upper bandwidth. Similarly, the controller switches the capacitor into the system when the voltage reaches a lower bandwidth.

The capacitor controllers can also operate on a time bias. The bandwidth can be raised or lowered during specific times of the day or temperature conditions. The bias is a means to estimate peak conditions and thereby provide additional compensation in the distribution network. The bias attempts to estimate and compensate for voltage and VARs based on time of day and/or temperature. As such, it is an imperfect means for actual voltage control in relation to use at customer service locations.

Some capacitor controllers use ambient temperature, primary voltage or time to control capacitor operation. Thus if the temperature in the location of the power distribution network is higher then an increased power demand due to cooling loads is likely. Capacitors can then be switched into the system to increase the voltage. If the temperature is low, the opposite applies.

Voltage and VARs

Power generation systems generate two power components, real power measured in watts, and reactive power measured in VARs. Both of these power components need to be produced and transmitted from the generator to the service customer. Real power flows from the generator to the load, and is used to drive loads such as electrical motors, create the heating effect in heaters, and the heating/lighting effect in lamps. Losses and associated voltage drops in the network are effected by the vector sum of real power and reactive power.

Reactive power provided from a generation or capacitor source to the load is the component necessary for the operation of magnetizing currents in motors, transformers and solenoids which are part of a customer service load.

In generators operating at rated capacity, the more reactive power, VARs, that are developed in the generating source, the lower is the amount of real power, watts, that can be generated by the generator source. There are greater losses in the electrical network and an increased consumption of fuel to generate VARs.

It is thus desirable to have a system whereby the power generator need generate only the least amount of VARs for the overall power distribution network. There is a need for the power generator to produce efficiently the most valuable component of power, namely real power watts.

There is often existent a VARs component in the network which is not efficiently used or distributed to the various service customers. It is unknown to effectively control VAR flow and distribution through the network in an optimum manner whereby the production of VARs by the electrical generator can be reduced.

There is a need to provide a control system for improving the efficiency of power transmission and distribution networks and for providing for energy savings.

SUMMARY

By the present invention, there is provided a system for controlling a power transmission and distribution network to minimize the disadvantages of known systems.

According to the invention, there are provided capacitors associated with a distribution circuit to customers. The capacitors are remotely controlled to reduce customer voltage to a low level in a predetermined range. A VAR controller is used to improve VAR flow in a transmission and distribution circuit.

Controlling capacitors responsively to the voltage to customer users under a voltage control permits control of the voltage to customers to be at a lower overall voltage level. This permits effectively less power to be generated for the customer and creates an energy savings for the customer and the generator source. Additionally, by controlling these capacitors under a VAR controller, the VARs supplied by these capacitors permits for a reduction in VARs generated by the generator. This further permits for more efficient power generation, reduction of line losses, and an increased ability to transfer power.

The capacitor control strategy is uniquely used to control both the appropriate customer voltage and VAR generation throughout the network. This provides firstly a significant advancement in reducing energy use. Secondly, the reduced energy level is transmitted more efficiently.

An aspect of the invention provides for the control of the power transmission and distribution by selectively controlling VARs or customer voltage as a higher priority. When customer voltage is controlled as a second priority, the customer voltage is maintained above a predetermined minimum voltage level. This philosophical and practical change of control in power transmission distribution networks is a major change with significant benefits to the consumer and to the power generation source.

By the invention, the energy use reduction, depending on voltage levels and regulation capability can be in the order of 1 to 5 percent and thereby the efficiency is increased. Overall, this represents a significant cost savings in energy production and usage. This can be measured in the savings of multi-millions of dollars each year for large energy producers.

According to the present invention, a power transmission and distribution network includes power lines for transmitting and distributing power at a customer voltage to different customers. Capacitor means and switch means selectively facilitate the switching of capacitor means into or out of operation of the network in accordance with the customer voltage level and the VARs available from the capacitors.

Voltage Control

A first voltage at a first location representing customers located at the first location of a distribution system is measured and communicated to a voltage control. Voltage deviations of the first voltage relative to a predetermined voltage range intended to be present at the first location are measured. A determination is made as to whether switching the capacitor means into or out of the network creates changes in the voltage deviation thereby to bring the first voltage of the first location within the predetermined voltage range. A signal is selectively transmitted from the voltage control to switch means for switching the capacitor means into or out of operation in the network thereby to effect any necessary change in the first voltage at the first location.

The voltage control includes a voltage rise table. A determination of the effect of the voltage rise table is made in relation to switching different capacitor means into or out of the network.

Preferably, there are multiple first locations with a predetermined voltage range. The voltage control determines whether switching the capacitor means in or out of the network changes the first voltage at the multiple first locations. The determination also includes ensuring that the change of the first voltage at one or more first locations maintains the first voltage in a predetermined voltage range at one or more other first locations.

Maintaining a voltage at each first location in a predetermined voltage range maintains the voltages at the customer service at the first locations in the predetermined range. The voltage range for the first location and the customer service locations is preferably between 114 volts and 120 volts for a customer service voltage intended to operate as close to 114 volts as possible. Having the voltage at a low level reduces energy consumption at the first location, namely for the customer.

VARs Control

The system also provides for switching capacitor means in or out of the network to control distribution losses. By employing VARs created by capacitors switched into circuit and using the capacitor generated VARs the number of VARs needed to be generated by the generator or other source is reduced. Hence the generator can operate more efficiently, namely generate more real power watts and the system will operate with less line loss.

Capacitor means are connected at locations associated with a distribution circuit, nominally at 12 kV, or the subtransmission circuit, nominally at 66 kV. By controlling the switching in or switching out of these capacitors and additionally coordinating the subtransmission circuit voltage, nominally 66 kV, the voltage and the VARs flow in the power transmission and distribution network is controlled.

Should a subtransmission circuit voltage, 66 kV, be high, the control of a first voltage acts to switch capacitors out of the network thereby to reduce voltage at the first location. When a substation circuit voltage is sufficiently high, all capacitor means should be switched off thereby causing a lagging power factor. On the other hand, if the transmission circuit voltage, 66 kV, is low, the voltage control should switch sufficient capacitors on to raise the voltage at the first location above the minimum voltage requirements. When a bus voltage is sufficiently low, all capacitors could be turned on that may cause a leading power factor.

If the system has a leading power factor, that is excessive VARs flow from the distribution capacitors, raising the substation bus voltage would cause additional capacitors to turn off. This decreases the excess VARs flowing from the distribution switch capacitor sources. Conversely, if the system has a lagging power factor that is providing excessive VARs from sources upstream to the distribution circuits, lowering the substation bus voltage would cause available capacitors to turn on. This decreases the excess VARs flow from the generator or other VAR sources upstream of the distribution circuits.

A further preferred aspect of the invention is to control the VARs flow and generation in the power transmission and distribution network. A VAR controller is provided operable on the principle of dQ/dV, where dQ is a measure of the change of VARs and dV is a measure of the change of voltage at the first locations. Preferably, the VAR controller operates by poling voltage changes at multiple spheres of influence, namely first locations, secondly determining whether capacitor means associated with distribution circuit are in or out of the network, and thirdly the effect of dQ/dV. The VARs controller thereupon acts to change taps on transformer means or transmission, 66 kV, capacitors to increase or decrease voltage at a subtransmission level, selectively nominally 66 kv.

By this invention, the placing into the network of the capacitor means associated with the first location causes VARs to be generated at the first location. This means that less VARs need to be generated by the generator and other VAR sources. Thus the generator can generate more real power, watts, and operate more efficiently than if the generator were creating more VARs.

Accordingly, the use of capacitors in the distribution circuit, namely associated with the first locations firstly can increase the voltage generated at the first locations and simultaneously can lower the value of the voltage needed from the distribution circuit 12 kV. This permits the overall voltage at the first location to be lowered in the predetermined range, but yet be maintained at a minimum voltage level in that range. This represents a savings for the customer and a savings in the amount of power needed to be generated.

The connection of capacitors into the network adjacent to the first location simultaneously generates VARs for the network. This permits for improved VAR flow in the transmission and distribution system, and the generator can then generate less VARs and be operational at a higher efficiency. This makes the overall power generation system more efficient, and reduces energy losses in the transmission and distribution network.

The invention includes the method of control, a system for control and control apparatus. The invention is directed to either one or both of voltage control and VAR flow control.

The invention is now further described with reference to the accompanying drawings.

DRAWINGS

Figure 3:
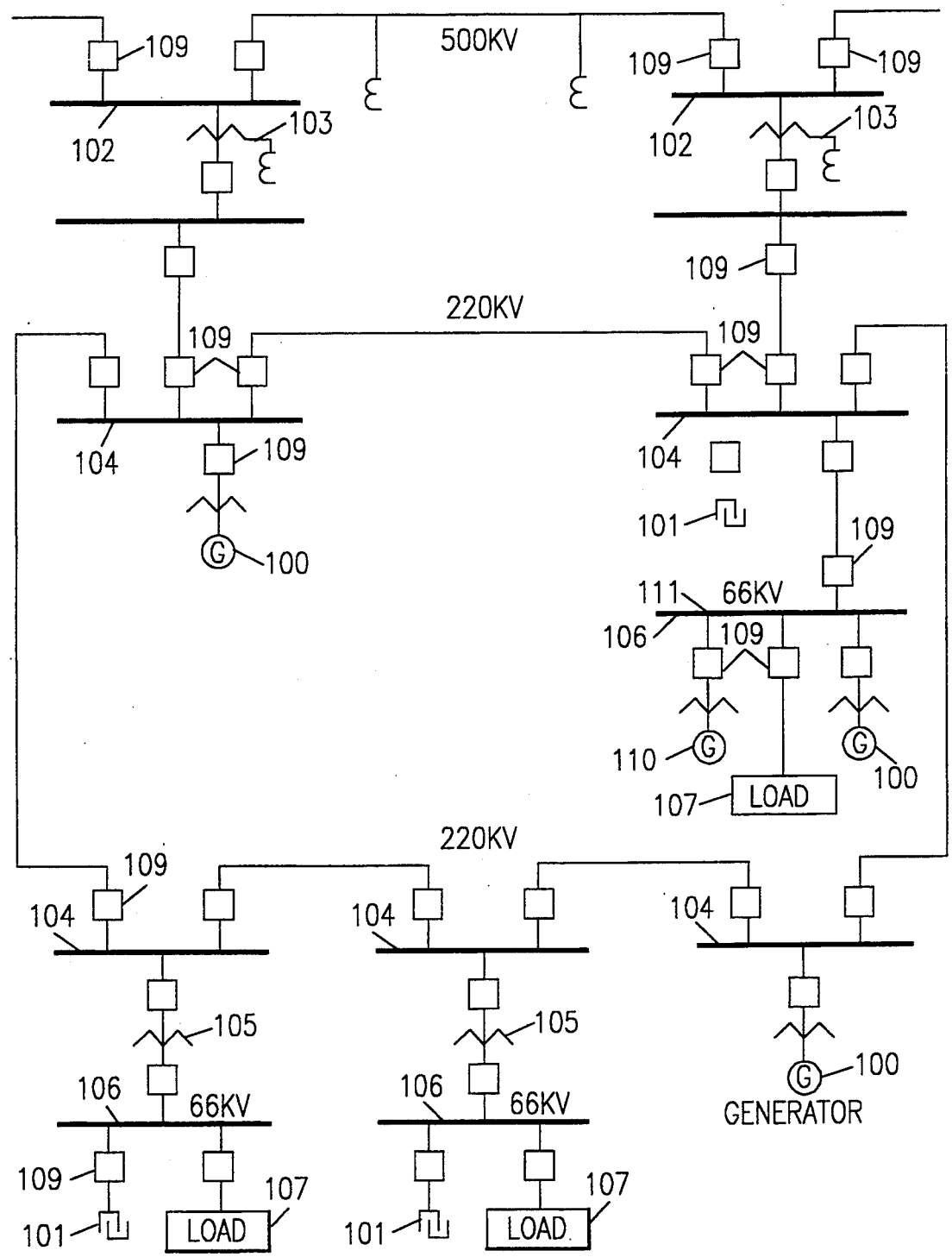

FIG. 3 is a power transmission and distribution network illustrating coordination between VAR generation and VAR control to maintain the desired 500 kV to 220 kV voltages and 66 kV voltages. The distribution network of the voltage control scheme from the 66 kV bus illustrated in FIG. 1 would be associated downstream with the 66 kV bus illustrated in FIG. 3.

Figure 4:
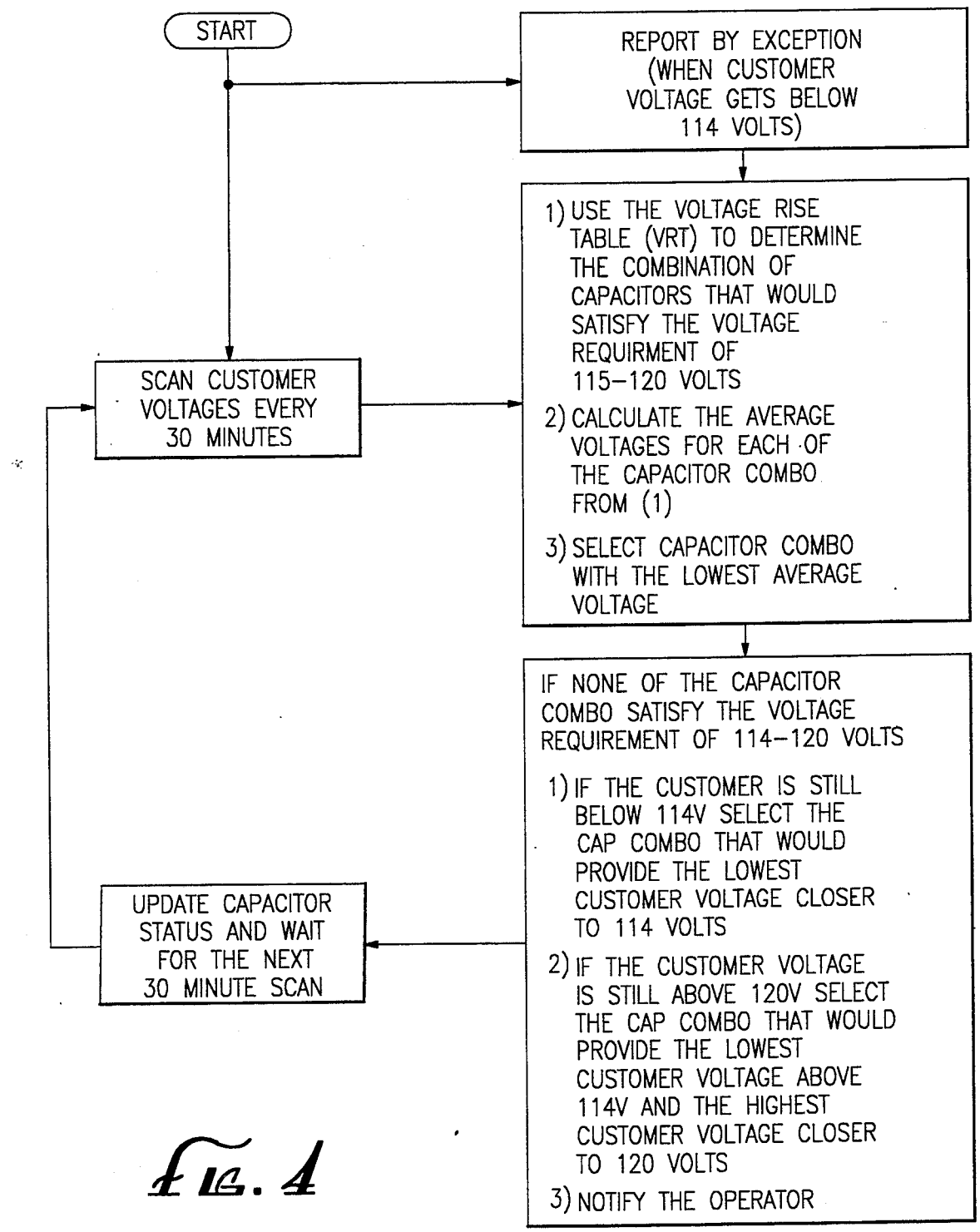

FIG. 4 is a voltage control flow diagram.

Figure 5:
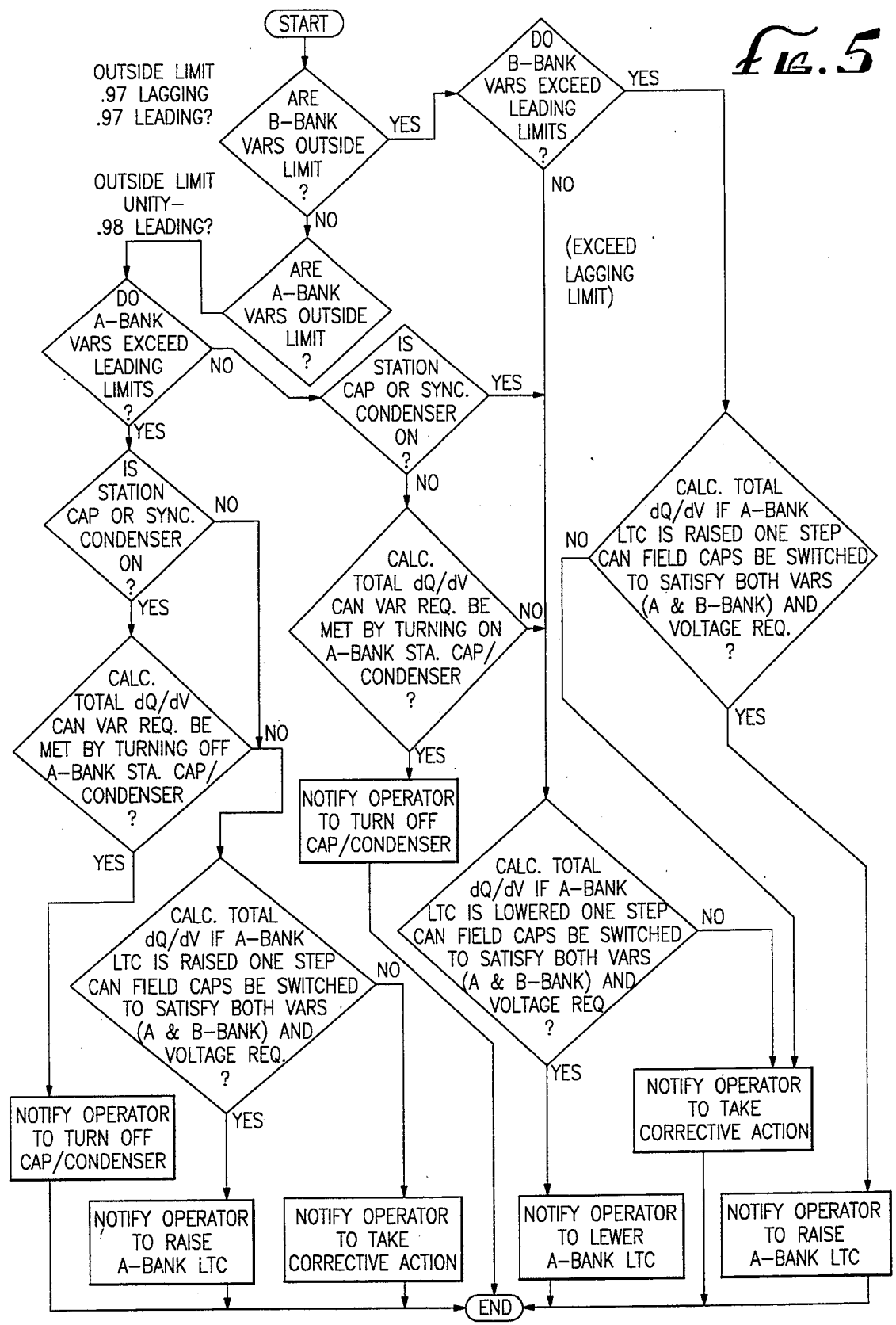

FIG. 5 is a VAR control flow diagram.

Figure 6:
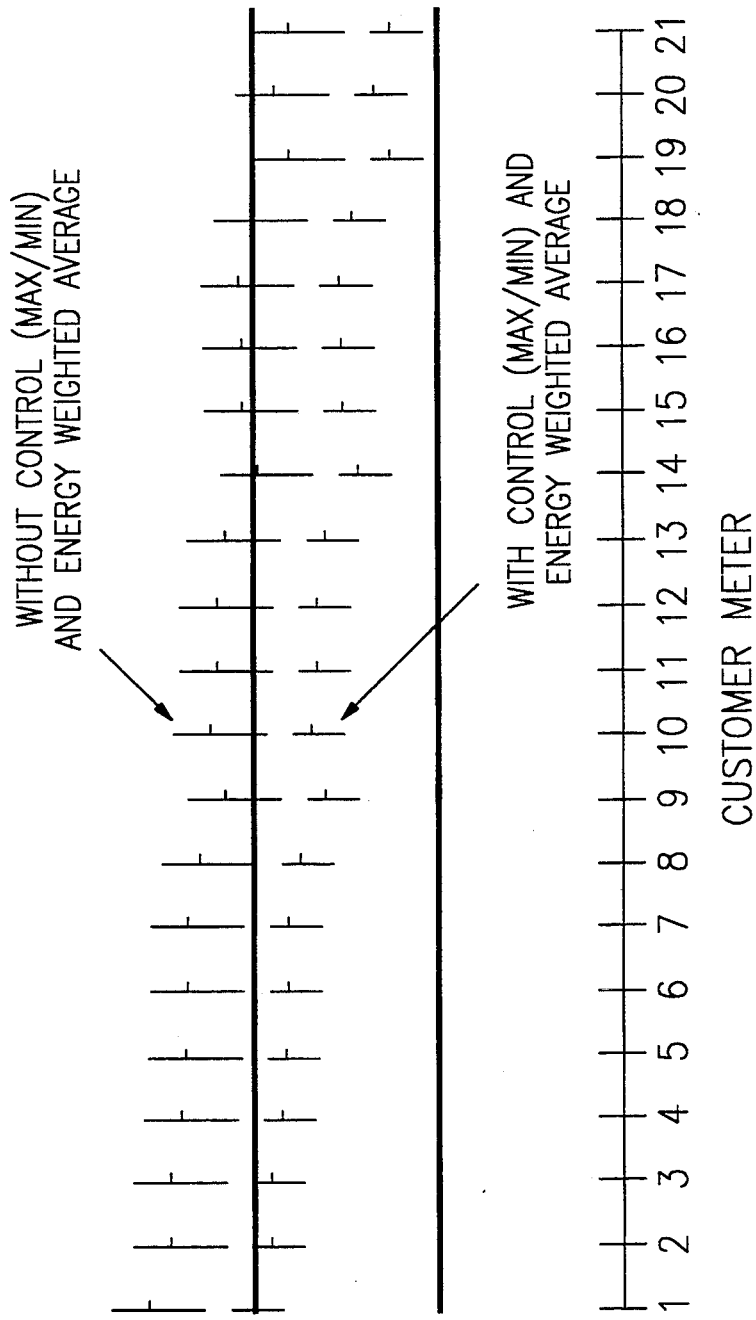

FIG. 6 is an illustration of the effect of applying voltage control to first locations illustrating a comparison of the customer voltages without the control and with the control.

Figure 7:
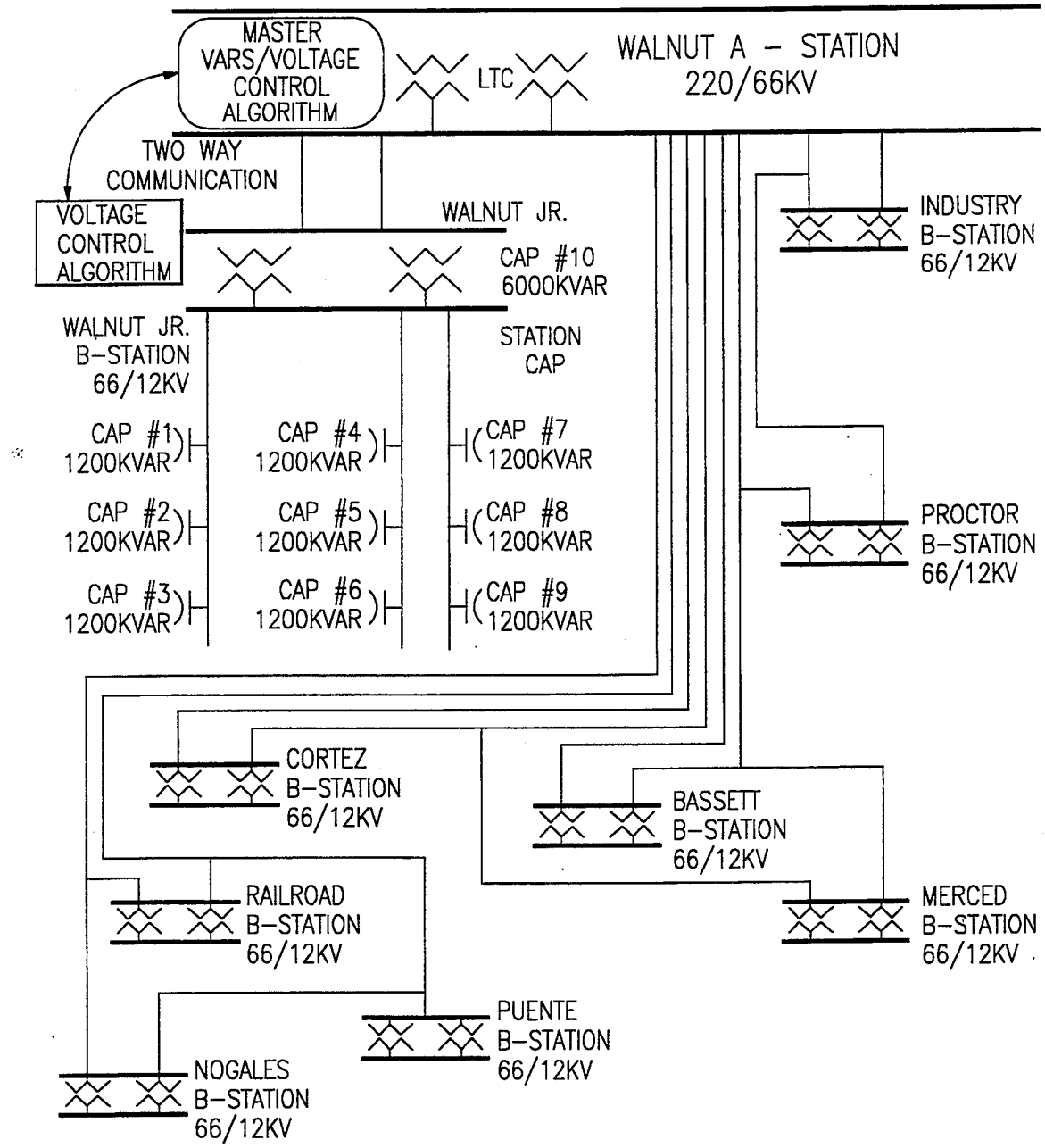

FIG. 7 is an illustration of voltage and VAR control on a transmission and distribution network.

Figure 8:
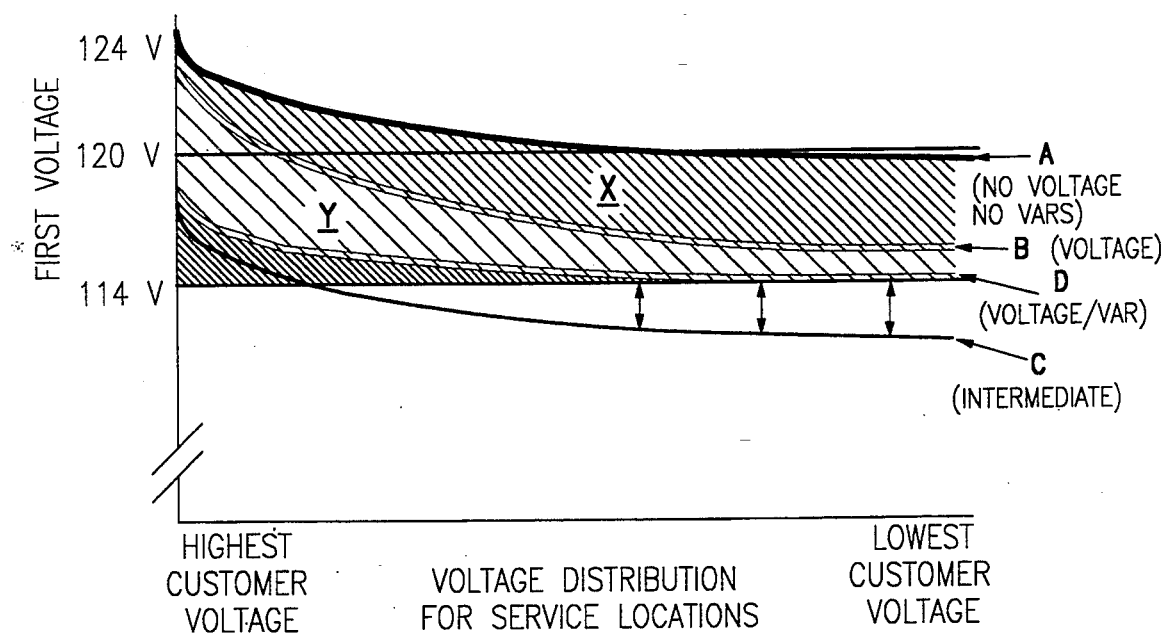

FIG. 8 is a representative graph illustrating the overall effect at a first location where there are several customer service locations of voltage control and VAR control in a network.

DESCRIPTION

Controlling the voltage and VARs in a power transmission and distribution network includes power lines and transformer means in the network for distributing power at different selected voltage to different locations. Automatic capacitor means and switch means are arranged in the network for selectively facilitating the switching of the capacitor means into or out of operation in the network.

Figure 1:
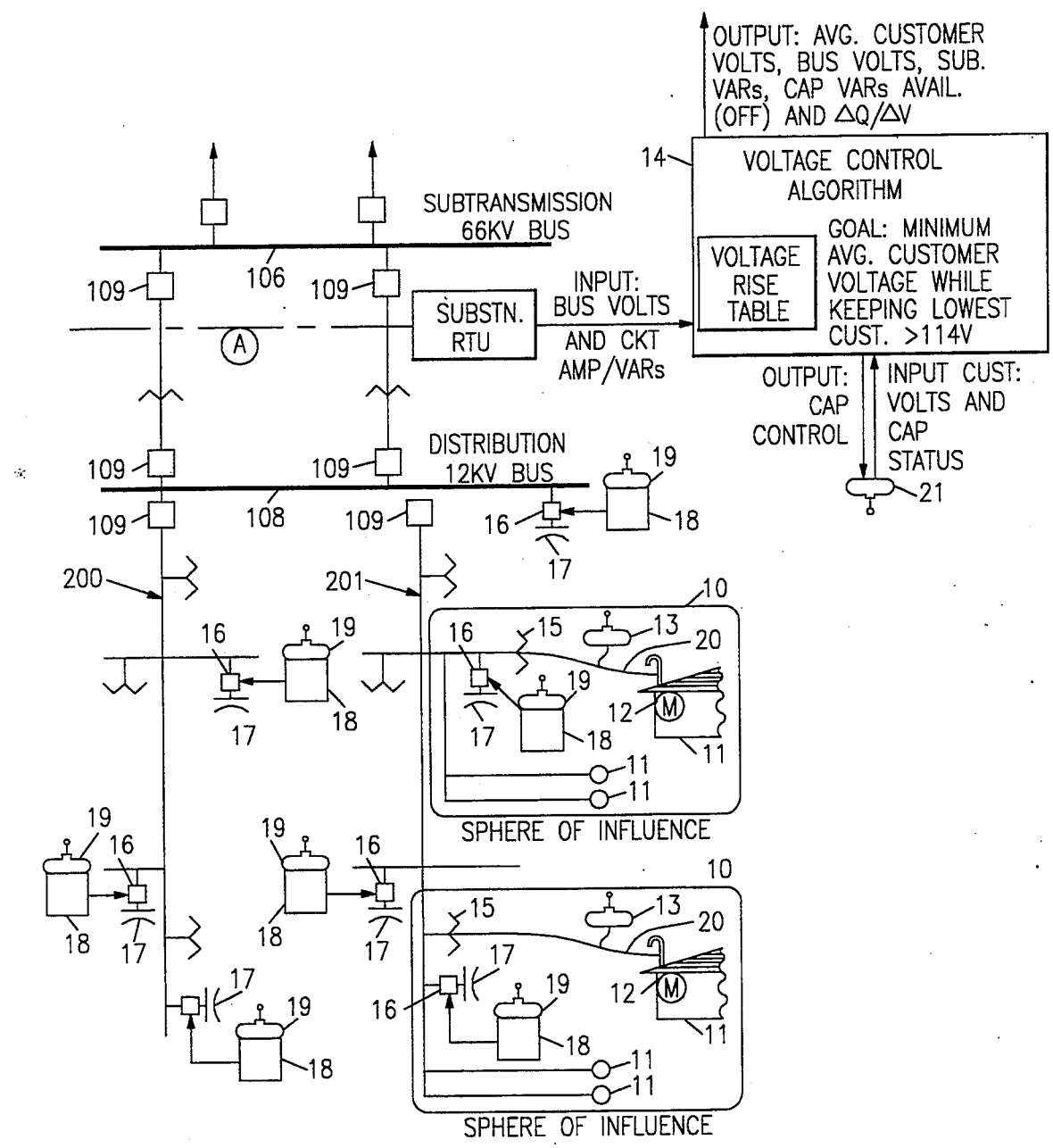
FIG. 1 is a power distribution network illustrating a voltage control scheme.
Figure 2:
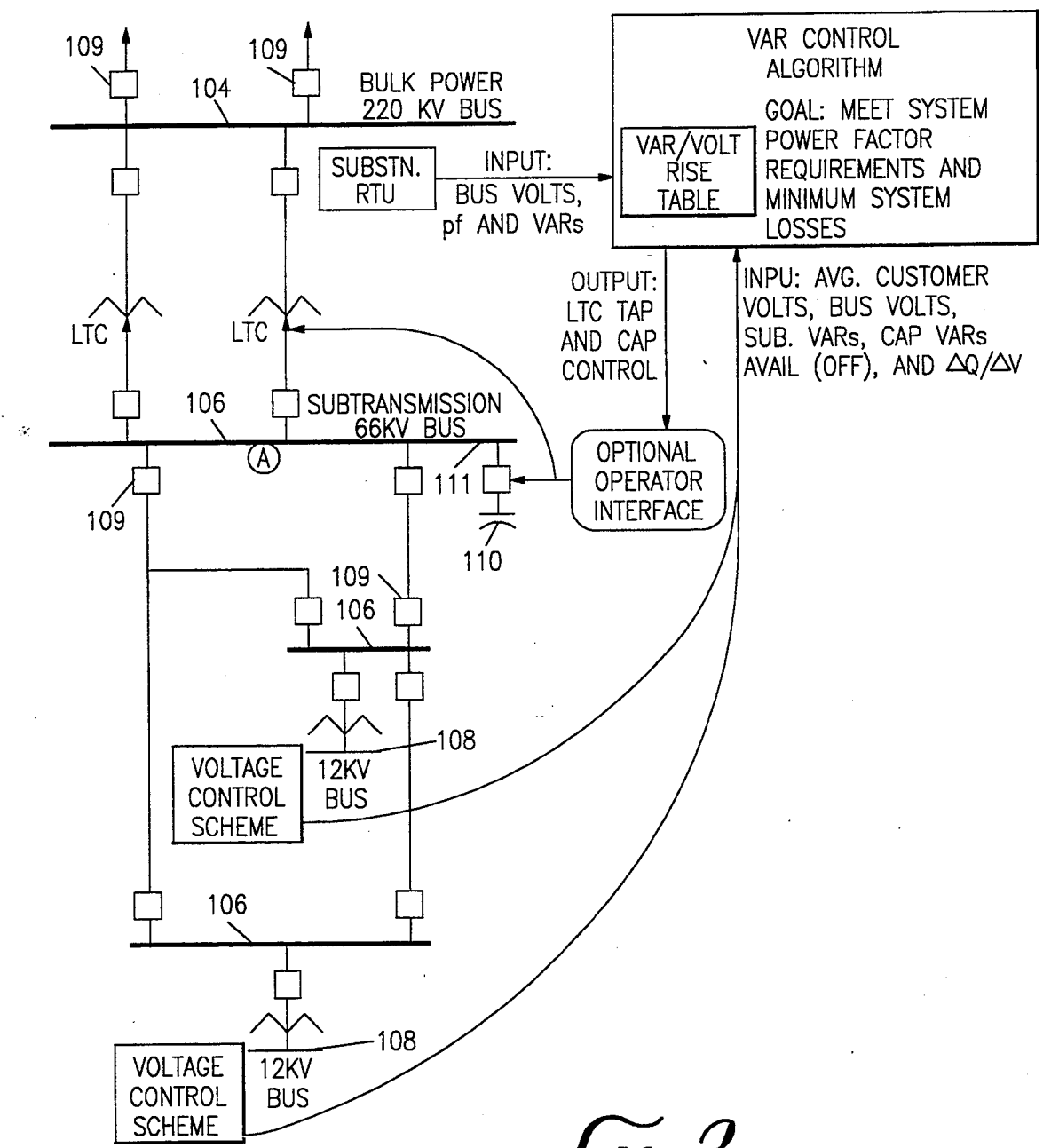
FIG. 2 is a power transmission network illustrating a VAR control scheme.

In FIGS. 1, 2, and 3 there are illustrated a power distribution network having power generators 100 connected to bulk power voltage buses at 500 kV, 220 kV. The generator 101 at 66 kV might also be a co-generator wind-power, or geothermal source. The bulk power is transmitted on 500 kV bus 102, and through transformers 103 to the bulk power bus 104. This 220 kV power is reduced by transformer 105 to a transmission voltage of 66 kV which is transmitted on the subtransmission circuit bus 106 to represented loads 107. In FIG. 1, such loads 107 would encompass the power distribution at 12 kV on the distribution circuit bus 108. The loads 107 are represented in detail in FIGS. 1 and 2 and "A" in FIG. 1 is correlated with the "A" in FIGS. 2 and 3 to show the interrelationship of FIGS. 1, 2, and 3. The different blocks 109 which in FIGS. 1, 2, and 3, represent circuit breakers and switches which can be operated to switch in and out different elements of the network. These switches 109 are not associated with capacitors. Other switches operate in conjunction with capacitors under control of a voltage control and VAR controller. In FIG. 1, there is shown two distribution circuits 200 and 201 from the distribution circuit bus 108.

Distribution Network Subject to Voltage Control

First locations 10 in the network on each of the distribution circuits 200 and 201 are spheres of influence considered as selected residential customer locations. In FIG. 1, there are two circuits 200 and 201 with first locations 10. These locations 10 receive voltage in a first predetermined voltage range, namely between 114 volts and 120 volts. The first locations 10 can be selected spaced locations being, for instance, six first locations 10 in a distribution network including say sixty customer service locations 11. Each of the first locations 10 would be represented by voltage of six specific customer service locations 11, and as such, each first location 10 defines a sphere of influence representing all customers 11 in the first location 10. FIG. 1 illustrates three customer service locations 11 in each of two spheres of influence or first locations 10. In different situations, there can be a different number of first locations 10 and a different number of customer service locations 11 in each first location 10.

At each first location 10, there are meters 12 for reading energy to the residential customer. The meters 12 for at least one representative service customer 11 can also measure voltage to the selected residential customers 11. For a representative voltage control in each first location 10, one of the service locations 11 also includes a radio 13 for transmitting measurements from the meter 12 to a remotely located control 14.

The meter 12 is located preferably at least with a customer at a customer service location 11 at the beginning of each sphere of influence and a customer service location 11 at the end of each sphere of influence. The meter 12 can also be located with a service customer 11 of normally high load.

Thus the selected service location 11 in the sphere of influence, first location 10, can be the location furthest from the location of capacitor 17. In this manner, reading and mounting such remote location 11 will ensure that other service locations in the first location 10 are retained within the predetermined range and have the minimum voltage. In such a system, the meter 12 is electronic and can communicate with the radio 13 appropriately.

Upstream of the radio 13 is a transformer 15 which, on the primary side, has a distribution voltage of 12 kV and on the secondary side has a voltage between 114 volts and 120 volts for a customer at the first location 10. Also on the primary side of the transformer 15, there is located capacitor means 17 and switch means 16. Each of these capacitor means 17 and switch means 16, operates with a capacitor controller 18 which includes a radio 19 for receiving and transmitting information to the remote voltage control 14. There is a radio 21 associated with each voltage control 14 for two-way communication with radios 13 and 19.

Periodically, the meter 12 measures the first voltage in secondary service a power line 20 directed to the first location 10. The radio 13 at the meter 12 periodically communicates the measured first voltage to the remote voltage control 14 and also by exception. The voltage control 14 or the radio 19 determines voltage deviations from the measured first voltage from a predetermined voltage range intended to be present at the first location 10. The voltage control 14 then determines whether switching the capacitor means 17 into or out of the network changes the voltage deviation thereby to bring the first voltage at the first location 10 within the predetermined voltage range. It then selectively transmits a signal from the control 14 to the switch means 16 for switching the capacitor means 17 into or out of operation in the network thereby to effect a change in the first voltage at the first location 10.

There are multiple first locations 10 with the predetermined voltage range at each first location 10. The determination at the control 14 is made as to whether switching the capacitor means 17 in or out of operation changes the first voltage at the multiple first locations 10. Changing the first voltage at one or more of the first locations 10 is effected while maintaining the first voltage in a predetermined voltage range at one or more other first locations 10.

The two-way communication between radios 13, 19, and 21 provides for individual control of the capacitor means 17, namely, each capacitor bank, and simultaneous monitoring of the customer service voltage. This voltage control approach achieves few percentage point voltage reduction at the first locations 10 and the need to generate less power by generating sources 100. This results in a significant overall energy savings.

Programmable Capacitor Controller

The capacitor control system 18 includes delta gathering, monitoring, and control of polemounted and padmounted distribution capacitor devices 17 on the distribution lines. The programmable capacitor 1 controller 18 has the capability of interfacing with other programmable capacitor controllers 18.

The capacitor control system 18 uses an Intermediate Computer (IC) located at strategic remote voltage control 14 and VAR controller sites for controlling and interfacing with operators and other systems. The interfaces may be with other locations remote from the IC. The voltage control 14 and VAR controller can be located in the same unit.

Communication messages are single message transmission from the control initiator 14 to the programmable capacitor controller. A single message return is for the programmable capacitor controller 18. The programmable capacitor controllers 18 has a small point count and operating at high speed (9600 BAUD). The return message contains the status of the controlled capacitor 17 plus all programmable capacitor controller data, status and flags. The programmable capacitor controller 18 checks the control command when received, determines the point to be operated, checks internally its circuits to insure the point being operated is the correct one, operates the point, checks that the point has operated (status), then initiates the return message.

The programmable capacitor controller has control points and indication points. Analog inputs, when supplied, have alarm bandwidth for each point. This bandwidth is downloadable from the IC and into nonvolatile memory.

The programmable capacitor controller 18 monitors true-RMS voltage, status of switches (open/closed), temperature, data and time, number of "open" and "close" (not both) operation cycles, and the set points. All data is concentrated into one information packet.

The programmable capacitor controller 18 has an internal time delay of five minutes, it allows the closing of capacitor switches, to allow sufficient timing for capacitor discharging.

The programmable capacitor controller 18 has primary, single phase, true RMS voltage sensing, providing one minute average readings for algorithm control and five minute average readings recorded for analysis.

Voltage Reduction Example

FIG. 6 illustrates an example of the outcome of lowering voltage through the described capacitor switching automation. A sampling of before and after customer service voltages (maximum, minimum, and Energy Weighted Average) is represented in FIG. 6. Customer service voltage is defined as the service voltage measured at the customer's meter 12, namely all the meters at the first locations 10.

The customer service voltages at all the locations 11 in a first location 10 are sampled at one-minute average intervals. As exemplified in FIG. 6, there are 22 meters read in the first location 10. The maximum and minimum are recorded on 24-hour periods. The Energy Weighted Average Customer Service Voltage (WAV) is calculated on 15-minute periods and is defined as follows:

$$WAV = \frac{\sum\limits_{i=0}^{n} E_i V_i}{\sum\limits_{i=0}^{n} E_i} = \frac{E_1 V + E_2 V_2 + \ldots + E_n V_n}{E_1 + E_2 + \ldots + E_n}$$

where:
- $V_1$ = 15-minute average Customer Service voltage for Period i (using the average of the 15 one-minute averages).
- $E_i$ = Customer energy consumed in the 15 minute period i (using the sum of previous 15 one-minute integrated watts multiplied by time)
- n = Total number of 15 minute periods within 24 hours - 96.
- i = 15 minute period number (ranges from 1 to 96).

The control 14 functions to automate control of switched capacitors 17 using Metricom (Trademark) packet radios 13, 19, and 21 and meters 12 with actual customer voltage feedback. The voltage control algorithm determines the optimal number and combination of capacitors 17 to be switched on, namely into circuit, at any time to minimize the average customer service voltage along the circuit yet maintain customer's minimum average voltage as close to 114 volts as possible.

Voltage Regulation Strategy

To achieve network-wide voltage reduction, the automated remote control of the distribution capacitors 17 is employed to reduce the WAV. The customer service WAV is reduced by implementing a distribution system capacitor switching algorithm using customer service voltage and remotely controlled switched capacitor controllers.

The control 14 uses the capacitor controllers 18 to automate the distribution capacitors 17 for optimal regulation of customer service voltage at the first location 10.

The capacitor switching algorithm uses the customer service voltage control points, namely the first locations 10 to remotely control switching of capacitor controllers 18 through the radio communication network associated with the capacitors 17. The control is a closed loop, namely operator intervention is not required except to meet emergency conditions and/or system voltage/VAR requirements.

Distribution networks have impedance that include both line reactance (the reactive component) and resistance (the real component). Long distribution circuits can produce capacitive current, but where they are less than ten miles long, the affect of capacitive current is negligable. Any reactive component of current which is 90 degrees lagging the voltage, causes voltage drop through line reactance. Conversely, any capacitive component of current which is 90 degrees leading the voltage, causes a voltage rise through the line reactance. Also, the real component of current which is on the same angle as the voltage causes a voltage drop through the line resistance.

Switching on a shunt connected capacitor 110 produces a relatively constant voltage rise at the capacitor bank location, regardless of the time of switching or the load on the circuit.

When any one of the capacitors 110 is switched on, it also produces a voltage rise on the substation bus 106 and all other circuits served from the same bus 106. The voltage rise on the substation bus 106 resulting from switching a specific distribution circuit capacitor is also relatively constant regardless of the load on the bus 106. The voltage rise is greatest at the capacitor point 111 of connection. The rise of the voltage of substation bus 106 also raises the voltage on all other circuits, served from the same bus 106, by the same amount.

The VAR output of a capacitor 110 is directly proportional to the square of the capacitor's terminal voltage. When the primary voltage is reduced, the VAR output of capacitor 110 is more greatly reduced and thus produces less voltage rise. However, for the purpose of controlling the capacitors 17, the difference in voltage rise as a result of reduced primary voltage is insignificant. For example, if at rated voltage, a 1200 kVAR capacitor bank 110 produced 1 volt rise. When the VAR output of capacitors 110 is reduced by two percent due to lower terminal voltage, the voltage rise is reduced approximately by two percent or 0.02 volt.

Capacitor Control Algorithm

The capacitor control algorithm is designed to reduce net energy transfer by meeting two main objectives:
  Reduce Average Customer Service Voltage to obtain customer energy conservation. This is voltage control, and operates under a voltage control algorithm.
  Reduce Distribution Losses, namely $I^2R$ losses, while meeting the network System VAR Requirements. This is VAR control, and operation under a VAR control algorithm.

Voltage/VAR control is optimized by coordinating the control of the distribution capacitors 19, substation capacitors 110, and substation bus voltage. Each of these control schemes is described separately. The integration of Voltage Control Algorithm and VAR Control Algorithm is also discussed.

Voltage Control

The flow chart of FIG. 4 sets out how the voltage control algorithm works.

Since capacitor bank 17 produces a relatively constant voltage rise, the affect of switching any capacitor 17 on the distribution system can be calculated in advance. A voltage rise table, Table 2, is created showing the interdependent voltage rise at each of the locations capacitors.

Exemplary times and voltages are set out in the algorithm.

1. Customer five-minute average voltage will be used as voltage indicator for customers within capacitor sphere of influence.
2. Repeat the algorithm routinely every 30 minutes and when the customer voltage is reported to be out of 114V–120V bandwidth (report by exception).
3. Transformer tap settings at substations will be reviewed and set appropriately before system is automated.
4. Proper VARs shall be planned for all substations and distribution circuits.

At the start, customer voltages are scanned every 30 minutes. VRT is used to determine the capacitor combination that meets the voltage requirement while providing the lowers circuit average voltage.

Example of Voltage Control

1. Determine Average Customer Voltages in Sphere of Influence 10.

A single circuit has three capacitors 17 and six customers 11 surround each capacitor bank 17 namely adjacent to and associated with each sphere of influence 10. The voltages of each customer service location 11 is recorded. These customer voltages are used as control points for the voltage control algorithm. The average voltage of these six customers is used to represent the customer voltage at the sphere of influence 10 of the capacitor 17.

Six control points for each capacitor bank 17 were selected. The location criteria for these points were: three points (one per phase) at the end and beginning of each capacitor circuit location 10. Due to limited hardware and cost considerations, this was not always possible and a minimum of three control points at the end of each capacitor circuit sections 10 were selected. Each capacitor circuit section is bounded by switches 16 so that in case of load transfer the entire circuit section 10 is transferred from one circuit to the other.

off produces 1.5 V rise at capacitor #1 point of connection, 1.0 V rise at capacitor #2 point of connection, and 1.0 V rise at capacitor #3 point of connection.

The second row of the VRT shows that switching on Capacitor #2 with all other capacitors remain switched off produces 1.0 V rise at capacitor #1 point of connection, 2.0 V rise at capacitor #2 point of connection, and 1.5 V rise at capacitor #3 point of connection.

The third row of the VRT shows that switching on Capacitor #3 with all other capacitors remaining switched off will produce 1.0 V rise at capacitor #1 point of connection, 1.5 V rise at capacitor #2 point of connection, and 2.5 V rise at capacitor #3 point of connection.

3. Theoretical voltages based on VRT and measured average customer voltages at first location 10 are calculated.

The number of capacitor switching combinations of n capacitors is equal to $2^n$.

TABLE 1

| | Customer Voltages within Different First Locations, Namely Spheres of Influence (11) | | | | | | |
|---|---|---|---|---|---|---|---|
| | Capacitor Status | Cust. #1 Voltage (service location 11 within each 10) | Cust. #2 Voltage (service location 11 within each 10) | Cust. #3 Voltage (service location 11 within each 10) | Cust. #4 Voltage (service location 11 within each 10) | Cust. #5 Voltage (service location 11 within each 10) | Cust. #6 Voltage (service location 11 within each 10) | Average Voltage For Different First Locations (10) |
| SW C (1) for a first first location (10) | off (0) | 117.0 | 118.0 | 117.0 | 116.0 | 118.0 | 116.0 | 117.0 |
| SW C (2) for a second first location (10) | on (1) | 116.0 | 114.0 | 116.0 | 114.0 | 115.0 | 115.0 | 115.0 |
| SW C (3) for a third first location (10) | off (0) | 112.0 | 113.0 | 113.0 | 112.0 | 113.0 | 112.0 | 112.5 |

2. Creation of Voltage Rise Table ("VRT")

A voltage rise table is created by measuring the effect of switching three capacitors 17 into or out of the circuit. The primary circuit voltage is used and measured at the location of each capacitor 17. For example purposes assume all capacitors are initially switched off.

TABLE 2

| Capacitors (17) Associated with Different First Locations (10) | Voltage Rise at Cap #1 | Voltage Rise at Cap #2 | Voltage Rise at Cap #3 |
|---|---|---|---|
| SW C (1) | 1.5 V | 1.0 V | 1.0 V |
| SW C (2) | 1.0 V | 2.0 V | 1.5 V |
| SW C (3) | 1.0 V | 1.5 V | 2.5 V |

The first row of the VRT shows that switching on Capacitor #1 with all other capacitors remain switched The following table shows eight different switching combinations of the three capacitors 17 shown in the example. "0" means the capacitor bank switch is opened and "1" means the capacitor bank switch is closed.

TABLE 3

| | | | Switching Combinations of Capacitors (17) and Voltage Rise Table | | | | |
|---|---|---|---|---|---|---|---|
| SW C (1) | SW C (2) | SW C (3) | Average Voltage V (1) | Average Voltage V (2) | Average Voltage V (3) | Meet Voltage Requirement | Average Voltage (Average) at Different First Locations |
| 0 | 0 | 0 | 116.0 | 113.0 | 110.0 | No | 113.3 |
| 0 | 0 | 1 | 117.0 | 114.5 | 113.5 | No | 115.0 |
| 0 | 1 | 0 | 117.0 | 115.0 | 112.5 | No | 114.8 |
| 0 | 1 | 1 | 118.0 | 116.5 | 115.0 | Yes | 116.5 |
| 1 | 0 | 0 | 117.5 | 114.5 | 112.0 | No | 114.7 |
| 1 | 0 | 1 | 118.5 | 115.5 | 114.5 | Yes | 116.2 |
| 1 | 1 | 0 | 118.5 | 116.0 | 113.5 | No | 117.0 |
| 1 | 1 | 1 | 119.5 | 117.5 | 116.0 | Yes | 117.7 |

Capacitor combination "101" (third from the bottom in Table 3) satisfies voltage requirement and has lowest average value. Therefore capacitors #1 and #3 should be switched on and capacitor #2 should be switched off. The combination "010" (third from the top) represents the customer voltages of Table 1.

VAR CONTROL

Generating Stations

VAR output is primarily obtained from the generators 100 and used to supply the inductive VAR requirements of the unit main transformer. As the unit load increases the boosting VAR output of the generator 100 is increased. As the unit load decreases, the VAR output is decreased.

Based on system load, characteristics the generator 100 boosting VAR output is increased in the same time frame as the load increases. The VAR output is decreased in the same time frame as the load decreases.

VAR resources for a transmission network include shunt capacitors and synchronous condensers and generators. VAR control devices are shunt reactors, synchronous condensers, generators and shunt capacitors A system for controlling VAR flow in a power transmission and distribution network includes power lines and transformer means for distributing power at different selected voltages to locations. Capacitor means and switch means are included for selectively facilitating the switching of the capacitor means into or out of the network.

There are means for obtaining first voltages in respective power lines directed to respective first locations, and means for communicating the first voltages to a VAR controller 22. The VAR controller determines whether a voltage change at the first location 10 causes switching capacitor means 17 associated with the respective first locations 10 to switch into or out of the network at the respective first locations 10 while maintaining the first voltages within a predetermined voltage range. When maintaining the first voltages at the first locations 10 within the predetermined voltage range, the means determines at least one of (i) the amount of available VARs from available capacitor means 17 not presently in the network at each first location 10 or (ii) the amount of removable VARs at each first location 10 by switching capacitor means 17 out of the network.

The VAR controller determines changes in VARs resulting from the change of voltage at the first locations 10 depending on the VAR availability, while maintaining the first voltage within the predetermined voltage range, the VAR controller selectively transmits a signal from the VAR controller to switch means for lowering or raising a higher voltage upstream of the first voltage thereby to effect a change in the VARs generated upstream of the first location.

Voltage and VAR Control

The VAR controller 22 can determine the effect of VAR change as a result of increasing or decreasing the voltage upstream by a predetermined amount. Such effect is a determination of the increase or decrease in the first voltages at the first locations 10 thereby permitting capacitor means to be switched into or out of the network at the first locations. If the capacitor means are switched into the network at the first location, the VAR controller can determine the amount of VARs available by switching selective capacitor means into circuit at the first locations while maintaining the voltage at the first locations within the predetermined voltage range.

In some cases, a desired voltage schedule at the distribution substation level allows all the distribution line capacitors to automatically switch on prior to the distribution station capacitors being manually or automatically switched on.

The utilization of these capacitor VAR resources is based on the substation maintaining a predetermined subtransmission voltage and VAR schedule which is established according to the total real power watt load on the station load tap changing transformer. Exceeding the voltage schedule may drive the distribution capacitors off, which causes the capacitor VARs to come from another source.

In reference to FIG. 5, there is shown a VAR control algorithm. At the beginning of the cycle, a determination is made whether the power factor is outside a limit of lagging or leading. If the B-bank VARs are outside the limit, a determination is made to ascertain whether the VARs exceed the leading limit. If so, the calculation dQ/dV is made of the A-bank load tap changing transformer (LTC) raised one step. In such a situation, can the field capacitors be switched to satisfy both VARs of the A and B banks, and the voltage requirement at the first locations. If "yes", the operator is notified to raise the A-bank LTC. If not, the operator is notified to take corrective action.

If the B-bank VARs do not exceed the leading limit, then the calculation dQ/dV is made with the A-bank LTC lowered one step. The determination is made in such a situation as to whether the field capacitors can be switched to satisfy both VARs in the A and B banks and retain the voltage in the first locations. If "yes", the operator is notified to lower the A-bank LTC. If not, the operator is notified to take corrective action.

A different loop arises if the B-bank VARs are not outside the limit. In such a situation, a determination is made as to whether the A-bank VARs are outside the limit If "yes" the determination is made as to whether the A-bank VARs exceed their leading limits. If "yes", the determination is made as to whether the station capacitor or condenser is on. If "yes", a determination is made as to whether the VARs can be met by turning off the A-bank station capacitors or condenser If "yes" the operator is notified to turn off the station capacitors.

Alternatively, if the A-bank VARs do not exceed the leading limits, a determination is made as to whether this station capacitor is on. If not, the determination is made as to whether the VAR requirement can be met by turning on the A-bank station capacitor. If "yes", the operator is notified to turn on the capacitor. If not, the calculation of dQ/dV if the A-banks are lowered one step and the voltage is retained.

If the station capacitor or condenser is already on, dQ/dV is calculated as indicated previously. If "yes", the operator is notified to turn on the capacitors.

If the A-bank rise exceeds the leading limits and the station capacitor is not on, then the dQ/dV calculation is made as previously indicated.

Example of Voltage and VAR Control

The following example illustrates how the VAR control algorithm is integrated with the Voltage Control Algorithm as a master VAR/Voltage control algorithm to optimize both the voltage of customers 11 and the transmission and distribution system VARS.

A typical transmission and distribution system is shown in FIG. 7 for a system of Southern California Edison. The network includes the Walnut A-Station with different B-stations. Walnut Jr. B-station also illustrates the distribution circuits with capacitors associated with first locations along the distribution circuit. Spheres of influence for each capacitor are not shown.

The Walnut system includes 9 distribution substations (B-Stations). Typically, each B-station can have from 6 to 13 circuits and up to 40 switched capacitors of different sizes. For simplicity, Walnut Jr. Distribution Substation is shown with only 3 distribution circuits, 9 circuit capacitors (1200 kVAR each), and one substation capacitor (6000 kVAR).

The VAR Control Algorithm's function is to meet the system VAR requirement by controlling the VAR flow to maintain the power factor close to unity. For example, the objective can be to maintain the power factor at the A-Bank between +/−0.98 power factor. The following example illustrates how the VAR Control Algorithm works to meet the system requirement +/− P.F.

Suppose that at a particular time, to keep the power factor between +/− 0.98 P.F. at the Walnut A-Bank, the VARS flow must be maintained within the limit of +20 MVAR (20,000 kVAR lagging) and −20 MVAR (20,000 kVAR leading). However, the real time VAR flow is +30 MVAR (lagging), exceeding the limit by +10 MVAR. The VAR Control algorithm must operate to bring the VAR flow back to the +/− 20 MVAR range. According to the VAR Control Algorithm's flow chart, when the VAR exceeds the lagging limit, it suggests that the system voltage is too high. This acts to turn most of the distribution circuit capacitors off. Therefore, the algorithm would assume that the system voltage must be lowered to a lower voltage.

Because of lower voltage, the Voltage Control algorithm will switch more capacitors on to compensate for the lower voltage. The system voltage can be lowered by changing the A-Bank load changing capacitor (LTC). Suppose that changing one LTC step changes the subtransmission system voltage by 1%. Before changing the LTC tap, the VAR/voltage algorithm calculates the effect of the VAR flow as a result of reducing the Walnut system voltage by 1%.

The status of the current capacitor before a bus voltage reduction by 1% is as follows:

| DISTRIBUTION CAPACITOR | CAP SIZE (KVAR) | CURRENT STATUS | OUTPUT (KVAR) | AVAILABLE (OFF-LINE) (KVAR) |
|---|---|---|---|---|
| CAP #1 | 1200 | ON | 1200 | |
| CAP #2 | 1200 | OFF | | 1200 |
| CAP #3 | 1200 | OFF | | 1200 |
| CAP #4 | 1200 | OFF | | 1200 |
| CAP #5 | 1200 | OFF | | 1200 |
| CAP #6 | 1200 | OFF | | 1200 |
| CAP #7 | 1200 | ON | 1200 | |
| CAP #8 | 1200 | OFF | | 1200 |
| CAP #9 | 1200 | OFF | | 1200 |
| CAP #10 | 6000 | OFF | | 6000 |
| | | TOTAL | 2400 | 14400 |

To determine the effect of reducing the bus voltage by 1%, the Voltage Control Algorithm is run to select the new theoretical capacitor combination with all the input voltages reduced by 1%. The new capacitors combination is calculated as follows:

| DISTRIBUTION CAPACITOR | CAP SIZE (KVAR) | NEW STATUS | OUTPUT (KVAR) | AVAILABLE (KVAR) |
|---|---|---|---|---|
| CAP #1 | 1200 | OFF | | 1200 |
| CAP #2 | 1200 | ON | 1200 | |
| CAP #3 | 1200 | ON | 1200 | |
| CAP #4 | 1200 | OFF | | 1200 |
| CAP #5 | 1200 | ON | 1200 | |
| CAP #6 | 1200 | ON | 1200 | |
| CAP #7 | 1200 | ON | 1200 | |
| CAP #8 | 1200 | OFF | | 1200 |
| CAP #9 | 1200 | OFF | | 1200 |
| CAP #10 | 6000 | OFF | | 6000 |
| | | TOTAL | 6000 | 10800 |

The calculation shows that the VAR output will be increased by 3600 kVAR if the bus voltage at Walnut Jr. is reduced by 1%. This raises the capacitor VAR output from 2400 kVAR to 6000 kVAR. Therefore the $$\frac{dQ}{dV} = \frac{+3600 \text{ kVAR}}{-1\%}$$

The same methodology can be applied to all the B-Stations on the Walnut system.

The following table is an example showing the increase in capacitor VAR output as a result of lowering the system voltage by 1%.

| Substation | Current Capacitor VAR output (kVAR) | Calculated Capacitor VAR Output if Bus Voltage is Reduced by 1% (kVAR) (dQ/dV) | Net Increase (kVAR) |
|---|---|---|---|
| Bassett | 4800 | 8400 | 3600 |
| Cortez | 3600 | 7200 | 3600 |
| Industry | 3600 | 7200 | 3600 |
| Merced | 2400 | 6000 | 3600 |
| Nogales | 3600 | 6000 | 2400 |
| Proctor | 2400 | 6000 | 3600 |
| Puente | 2400 | 7200 | 4800 |
| Railroad | 4800 | 8400 | 3600 |
| Walnut Jr. | 1200 | 6000 | 3600 |
| | | Total Increase | 18,000 |

The table shows that by lowering the Walnut system voltage by 1%, the net VARS flow will be increased by 18 MVAR. This reduces the VAR flow from +30 MVAR to +8 MVAR. This reduced SYSTEM I²R loss while meeting the system VAR requirement of +/−20 MVAR. The improved VAR flow in the distribution system permits for greater energy efficiency in the network.

Likewise, if a substation capacitor is available, of say 14.4 MVAR, this has the effect of raising the bus voltage by 1% and increasing VARs by 14.4 MVAR. Thus the VAR/Voltage control calculates to determine the optimum combination of available substation capacitors and LTC tap settings.

Example Illustrating Graphically the Effect of Control

In FIG. 8 there is shown the effect of the voltage control and VAR control at different service locations 11 within a sphere of influence 10. Prior to any voltage or VAR control, the voltage distribution is depicted by line A with the highest voltage customer being about 121 volts and the lowest about 119 volts. With control employing the voltage control algorithm, the voltage follows distribution B. The highest voltage is 120 volts and the lowest is 114 volts.

To effect improved VAR flow in the system, there is a voltage downward adjustment at a substation. The voltage distribution would drop downwardly to distribution C which is an intermediate position. The highest voltage would be about 115 volts and the lowest about 110 volts. This is unacceptable as a distribution service voltage to customers, so the voltge control algorithm triggers capacitors associated with the first locations to be switched into the network. This causes the voltage of customers at the lower end of distribution to use as indicated by the vertical arrows. The final distribution of voltage for the service locations under both voltage and VAR control is depicted by distribution D. All the voltages are at or near the minimum 114 volts.

The shaded area X would represent the savings in energy consumption under voltage control. The area represented by shaded area Y indicates the additional savings of energy, and increased efficiency under voltage control and VAR control.

General

Many other examples of the invention exist, each differing from others in matters of detail only.

For instance, the voltage control and/or the VAR controller can be located at the capacitor means associated with each switch means in the distribution circuit. This may minimize the need for extensive communications. The voltage control and VAR controller can be integrated into a single hardware, software or firmware package or unit or could be separate items.

In other situations, instead of controllable capacitor controllers, the control for the capacitor means may be a relatively simple switch which can operate in response to a signal by radio or otherwise.

The VAR generation upstream of the first voltage can be generated by generators, 220 kV capacitors in the transmission system, and line charging of light loaded lines. By being able to redistribute the VAR flow in the transmission and distribution system, excess VARs can be efficiently used. This provides for increased efficiency in the overall network and its components including transformers, transmission components and other circuitry in the system.

Different configurations of spheres of influence 10 can be created. Thus there can, for instance, be six meters 12 per capacitor controller 18, with three meters 12 near the beginning of the sphere of influence 10 and three near the end of the sphere of influence 10. There could for instance be a thousand customers 11 in each sphere of influence 10.

Moreover, with the voltage control and VAR controller, it is possible, when circuits 200 and 201 are reconfigured, to appropriately recalculate the voltage rise table. Reconfiguration arises when spheres of influence 10 are changed in whole or part from circuit 200 to 201 or vice versa. Thus the voltage rise table can be of a dynamic nature, where recalibration of the table can be effected to permit for change of circumstances in the distribution network.

The invention is to be determined in terms of the following claims.

We claim:

1. A method for controlling voltage in a power distribution network including power lines for distributing power at a lower voltage and at a higher voltage, power being distributed at the lower voltage to multiple lower-voltage locations, the network including, at the higher voltage, capacitor means and switch means for selectively switching the capacitor means into or out of the network, the method comprising the steps of:

(a) measuring the voltage at one or more lower-voltage location, (b) ascertaining the deviation, if any, of the measured voltage from a predetermined voltage range intended to be present at the lower-voltage location, (c) determining whether switching the capacitor means into or out of the network changes the voltage deviation to bring the voltage at the measured lower-voltage location within the predetermined voltage range, and (d) selectively transmitting a signal to the switch means for switching the capacitor means into or out of operation in the network to effect a change in the voltage at the measured lower-voltage location.

2. A method as claimed in claim 1 wherein the step of selectively transmitting a signal comprises transmitting the signal from a voltage controller, wherein the voltage controller is located remote from the lower-voltage locations.

3. The method of claim 1 wherein controlling the voltage at the measured lower-voltage location in step (d) results in reducing energy consumption at said lower-voltage location.

4. A method as claimed in claim 1 wherein the step of measuring comprises measuring at multiple lower-voltage locations and step (c) comprises determining the effect of switching the capacitor means on the voltage at the multiple lower-voltage locations.

5. A method as claimed in claim 4 wherein the step of selectively transmitting a signal comprises transmitting a signal to change the voltage at one or more lower-voltage locations while maintaining the voltage in the predetermined voltage range at one or more other lower-voltage locations.

6. A method as claimed in claim 1, 4, or 5 wherein the network further comprises transformer means at the higher voltage, the transformer means having a primary side and a secondary side, and wherein the capacitor means comprises multiple capacitor means located on the primary side of the transformer means, and wherein the step of measuring comprises measuring the voltage on the secondary side of the transformer means.

7. A method as claimed in claim 1, 4 or 5 wherein the network comprises multiple service locations related to each lower-voltage location, and wherein the voltage measured at the lower-voltage location is representative of the voltages at the multiple service locations.

8. A method as claimed in claim 1, 4, or 5 wherein the network comprises a distribution circuit at the higher voltage, the distribution circuit being selectively operable at a nominal voltage between about 4 kV and 33 kV, and wherein the capacitor means is switched into or out of the distribution circuit, and wherein the lower-voltage locations have a predetermined voltage range selectively between about 500 volts and 110 volts.

9. A method as claimed in claim 1, 4 or 5 wherein the step of selectively transmitting a signal comprises transmitting a signal to maintain the lower voltage at the lower-voltage locations close to a minimum level of the predetermined voltage range.

10. A method as claimed in claim 1, 4, or 5 wherein the capacitor means comprises multiple capacitor means, and step (c) comprises determining via a voltage rise table the effect of switching the capacitor means into or out of the networks, wherein the voltage rise table provides information about the effect of switching the capacitor means into or out of the network on the voltage at multiple lower-voltage locations.

11. A method for controlling reactive power flow in a power transmission and distribution network including power lines and transformer means for distributing power at a lower voltage and at a higher voltage, power being distributed at the lower voltage to multiple lower-voltage locations, the network including, at the higher voltage, capacitor means and switch means for selectively lowering or raising the higher voltage, the method comprising the steps of:

(a) measuring the voltage at one or more lower-voltage location (b) measuring the reactive power flow at the higher voltage, and upstream of the higher voltage (c) determining:
(1) whether a change of the measured voltage, within a predetermined voltage range, at said lower-voltage location causes the capacitor means to switch into or out of the network,
(2) the changes in reactive power flow resulting from a change of voltage, within the predetermined range, at said lower-voltage location,
(3) with the proviso that the measured voltage is maintained within the predetermined voltage range, at least one of the following: (i) the available reactive power from available capacitor means not presently in the network, or (ii) the removable reactive power at the higher voltage by switching capacitor means presently in the network out of the network, and (d) depending on the reactive power availability or removability, and the measured reactive power flows, selectively transmitting a signal to the switch means for lowering or raising the higher voltage to effect a change in the reactive power generated at the higher voltage with the proviso that the lower voltage remains within the predetermined voltage range.

12. A method as claimed in claim 11 wherein the network further comprises a voltage controller associated with the lower-voltage location to be measured, the voltage controller having information about (i) the voltage at the lower-voltage location, and (ii) capacitor means available to be switched into or out of the network, and wherein the step of measuring the voltage includes obtaining the voltage from the voltage controller and wherein the determining steps c(3)(i) and c(3)(ii) include obtaining information from the voltage controller about capacitor means available to be switched into or out of the network.

13. A method as claimed in claim 11 wherein the network further comprises capacitor switch means for selectively switching the capacitor means into or out of the network, and wherein the step of selectively transmitting a signal includes selectively transmitting a signal to the capacitor switch means to selectively switch the capacitor means into or out of the network to effect a change in the reactive power generated at the higher voltage.

14. A method as claimed in claim 11 wherein the network further comprises a transformer at the higher voltage, the transformer including a load tap changer, the network including transformer switch means for adjusting the load tap changer, and wherein the step of selectively transmitting a signal comprises selectively transmitting a signal to the transformer switch means to selectively adjust the load tap changer for lowering or raising the higher voltage.

15. A method as claimed in claim 11 wherein the step of measuring the voltage comprises measuring the voltage at a plurality of lower-voltage locations.

16. A method as claimed in claim 11 wherein the network further comprises capacitor means at the lower voltage, and wherein step b(3)(ii) comprises determining: (1) the effect of decreasing the higher voltage by a predetermined amount on decreasing the voltages at the lower-voltage locations thereby permitting the capacitor means at the lower voltage to be switched into the network and (2) the reactive power flow made available by switching the capacitor means at the lower voltage into the network thereby making reactive power available from the capacitor means at the lower-voltage for distribution in the network in place of reactive power generated at the higher voltage.

17. A method as claimed in claim 11 wherein the network further comprises capacitor means at the lower-voltage locations, and wherein the method includes changing the number of capacitor means in the network at different lower-voltage locations thereby to adjust the voltages at the lower-voltage locations and the amount of reactive power generated from the lower-voltage locations.

18. The method of claim 11 wherein controlling reactive power flow in step (d) results in reducing energy losses in the network.

19. A method for controlling voltage and reactive power flow in a power transmission and distribution network including power lines and transformer means for distributing power at a lower voltage, at an intermediate voltage, and at a higher voltage, power being distributed at the lower voltage to multiple lower-voltage locations, the network including, at the intermediate voltage, capacitor means and capacitor switch means for selectively switching the capacitor means into or out of the network, the network further comprising voltage switch means for selectively lowering or raising the higher voltage, the method comprising the steps of:

(a) measuring the voltage at one or more lower-voltage location, (b) ascertaining the deviation, if any, of the measured voltage from a predetermined voltage range intended to be present at the lower-voltage location, (c) determining whether switching the capacitor means into or out of the network changes the voltage deviation to bring the voltage at the measured lower-voltage location within the predetermined voltage range, (d) selectively transmitting a signal to the capacitor switch means for switching the capacitor means into or out of operation in the network to effect a change in the voltage at the measured lower-voltage location, (e) measuring the reactive power flow at the higher voltage, (f) determining:
(1) whether a change of the measured voltage, within the predetermined voltage range, at said lower-voltage location causes the capacitor means to switch into or out of the network,
(2) the changes in reactive power flow resulting from a change of voltage, within the predetermined range, at said lower-voltage location,
(3) with the proviso that the measured voltage is maintained within the predetermined voltage range, at least one of the following: (i) the available reactive power from available capacitor means not presently in the network, or (ii) the removable reactive power at the intermediate voltage by switching capacitor means presently in the network out of the network, and (g) depending on the reactive power availability or removability, and the measured reactive power flow, selectively transmitting a signal to the voltage switch means for lowering or raising the higher voltage to effect a change in the reactive power generated at the higher voltage, with the proviso that the lower voltage remains within the predetermined voltage range.

20. A method as claimed in claim 19 wherein the step of measuring the voltage comprises measuring at multiple lower-voltage locations and step (c) comprises determining the effect of switching the capacitor means into or out of the network on the voltage at the multiple lower-voltage locations, and wherein step (d) comprises transmitting a signal to change the voltage at one or more lower-voltage locations while maintaining the voltage in the predetermined voltage range at one or more other lower-voltage locations.

21. A method as claimed in claim 19 wherein the network comprises multiple service locations related to each lower-voltage location, and wherein the voltage measured at lower-voltage location is representative of the voltages at the multiple service locations.

22. A method as claimed in claim 19 wherein the step of selectively transmitting a signal to the capacitor switch means comprises transmitting the signal from a voltage controller, and wherein the step of selectively transmitting a signal to the voltage switch means comprises transmitting the signal from a reactive power controller, wherein the voltage controller and the reactive power controller are located remote from the lower-voltage locations.

23. A method as claimed in claim 19 wherein the network further comprises a distribution circuit at the intermediate voltage, and a subtransmission circuit at the higher voltage, the distribution circuit being selectively operable at a nominal voltage between about 4 kV and 33 kV, and wherein the capacitor means is selectively switched into or out of the distribution circuit, and wherein the lower-voltage locations have a predetermined voltage range selectively between about 500 volts and 110 volts, and wherein the subtransmission circuit is at a nominal voltage of about 66 kV and 115 kV.

24. A method as claimed in claim 19, 20 or 21 wherein the capacitor means comprises multiple capacitors, and wherein step (c) comprises determining via a voltage rise table the effect of switching the capacitors into and out of the network, wherein the voltage rise table provides information about the effect of switching the capacitor means on the voltage at multiple lower-voltage locations.

25. The method of claim 19 wherein controlling the voltage at the measured lower-voltage location in step (d) results in reducing energy consumption at said lower-voltage location, and wherein controlling reactive power flow in step (g) results in reducing energy losses in the network.

26. The method of claim 19 wherein steps b-d are taken after the steps e-g.

27. A method as claimed in claim 26 wherein the step of measuring comprises measuring at multiple lower-voltage locations, and the step of determining whether switching the capacitor means in or out of operation comprises determining the effect of switching the capacitor means into or out of the network on the voltage at the multiple lower-voltage locations, and wherein the step of selectively transmitting a signal to the capacitor switch means comprises transmitting a signal to change the voltage at one or more lower-voltage locations while maintaining the voltage in the predetermined voltage range at one or more other lower-voltage locations.

28. A method as claimed in claim 26 wherein the network comprises multiple service locations related to each lower-voltage location, and wherein the voltage measured at the lower-voltage location is representative of the voltages at the multiple service locations.

29. A method as claimed in claim 26 wherein the step of selectively transmitting a signal to the capacitor switch means comprises transmitting the signal from a voltage controller, and wherein the step of selectively transmitting a signal to the voltage switch means comprises transmitting the signal from a reactive power controller, wherein the voltage controller and the reactive power controller are located remote from the lower-voltage locations.

30. A method as claimed in claim 26 wherein the network further comprises a distribution circuit at the intermediate voltage, and a subtransmission circuit at the higher voltage, the distribution circuit being selectively at a nominal voltage between about 4 kV and 33 kV, and wherein the capacitor means is selectively switched into or out of the distribution circuit, and wherein the lower-voltage locations have a predetermined voltage range selectively between about 500 volts and 110 volts, and wherein the subtransmission circuit is at a nominal voltage of about 66 kV and 115kV.

31. A method as claimed in claim 26, 27 or 28 wherein the capacitor means comprises multiple capacitors, and wherein step (c) comprises determining via a voltage rise table the effect of switching the capacitors into and out of the network, wherein the voltage rise table provides information about the effect of switching the capacitors on the voltage at multiple lower-voltage locations.

32. The system of claim 26 wherein the measuring means comprises: (i) means for measuring the voltage at a plurality of lower-voltage locations, and (ii) means for statistically converting the measured voltages to a representative voltage.

33. The system of claim 32 wherein the conversion means averages the measured voltages.

34. A system for controlling voltage in a power distribution network including power lines for distributing power at a lower voltage and at a higher voltage, power being distributed at the lower voltage to multiple lower-voltage locations, the network including, at the higher voltage, capacitor means and switch means for selectively switching the capacitor means into or out of the network, the system comprising:

(a) means for measuring the voltage at one or more lower-voltage location, (b) means for ascertaining the deviation, if any, of the measured voltage from a predetermined voltage range intended to be present at the lower-voltage location, (c) means for determining whether switching the capacitor means into or out of the network changes the voltage deviation to bring the voltage at the measured lower-voltage location within the predetermined voltage range, and (d) means for selectively transmitting a signal to the switch means for switching the capacitor means into or out of operation in the network to effect a change in the voltage at the measured lower-voltage location.

35. A system as claimed in claim 34 wherein the measuring means further comprises means for measuring the voltage at multiple lower-voltage locations, and wherein the determining means comprises means for determining the effect of switching the capacitor means into or out of the network on the voltage at multiple lower-voltage locations.

36. A system as claimed in claim 34 wherein the system further comprises a voltage controller, the voltage controller comprising means for transmitting a signal to the switch means, and wherein the means for selectively transmitting a signal transmits the signal from the voltage controller, and wherein the voltage controller is located remote from the lower-voltage locations.

37. A system as claimed in claim 34 wherein controlling the voltage at the measured lower-voltage location results in reducing energy consumption at said lower-voltage location.

38. A system as claimed in claim 35 wherein the means for selectively transmitting a signal further comprises means for transmitting a signal to change the voltage at one or more lower-voltage locations while maintaining the voltage in the predetermined voltage range at one or more other lower-voltage locations.

39. A system as claimed in claim 34, 35, or 38 wherein the network comprises a distribution circuit at the higher voltage, the distribution circuit being selectively operable at a nominal voltage between about 4 kV and 33 kV, and wherein the switch means switches the capacitor means into or out of the distribution circuit, and wherein the lower-voltage locations have a predetermined voltage range selectively between about 500 volts and 110 volts.

40. A system as claimed in claim 34, 35, or 38 wherein the network further comprises transformer means at the higher voltage, the transformer means having a primary side and a secondary side, and wherein the capacitor means comprises multiple capacitor means located on the primary side of the transformer means, and wherein the measuring means further comprises means for measuring the voltage on the secondary side of the transformer means.

41. A method as claimed in claim 34, 35 or 38 wherein the network comprises multiple service locations related to each lower-voltage location, and wherein the measuring means further comprises means for measuring the voltage at the lower-voltage location, wherein the measured voltage is representative of the voltages at the multiple service locations.

42. A system as claimed in claim 34, 35, or 38 wherein the capacitor means comprises multiple capacitor means and wherein the system further comprises a voltage controller comprising a voltage rise table, the voltage rise table providing information about the effect of switching the capacitor means into or out of the network on the voltage at multiple lower voltage locations, and wherein the determining means further comprises means for using the voltage rise table to switch the capacitor means into or out of the network.

43. A system as claimed in claim 34, 35, or 38 wherein the means for selectively transmitting a signal further comprises means for selectively transmitting a signal to maintain the lower voltage at the lower-voltage locations close to a minimum level of the predetermined voltage range.

44. A system for controlling reactive power flow in a power transmission and distribution network including power lines and transformer means for distributing power at a lower voltage and at a higher voltage, power being distributed to multiple lower-voltage locations at the lower voltage, the network including, at the higher voltage, capacitor means and switch means for selectively lowering or raising the higher voltage, the system comprising:

(a) means for measuring the voltage at one or more lower-voltage location, (b) means for measuring the reactive power flow at the higher voltage and upstream of the higher voltage, (c) means for determining whether a voltage change at the lower-voltage location causes the capacitor means to switch into or out of the network while maintaining the lower voltage within a predetermined voltage range, (d) means for ascertaining, with the proviso that the measured voltage is maintained within the predetermined voltage range, at least one of the following: (i) the available reactive power from available capacitor means not presently in the network or (ii) the removable reactive power at the higher voltage by switching the capacitor means presently in the network out of the network, (e) means for determining the changes in reactive power resulting from the change of voltage, within the predetermined range, at said lower-voltage location, and (f) means for selectively transmitting a signal to the switch means, depending on reactive power availability or removability, and the measured reactive power flows, for lowering or raising the higher voltage to effect a change in the reactive power generated at the higher voltage, with the proviso that the lower voltage remains within the predetermined voltage range.

45. A system as claimed in claim 44 wherein the system further comprises a voltage controller associated with the lower-voltage location to be measured, the voltage controller having information about (i) the voltage at the lower-voltage location, and (ii) capacitor means available to be switched into or out of the network, and wherein the means for measuring the voltage obtains the voltage at the lower-voltage location from the voltage controller and wherein the ascertaining means further comprises means for obtaining information from the voltage controller about capacitor means available to be switched into or out of the network.

46. A system as claimed in claim 44 wherein the network further comprises capacitor switch means for selectively switching the capacitor means into or out of the network, and wherein the means for selectively transmitting a signal comprises means for transmitting a signal to the capacitor switch means for selectively switching the capacitor means into or out of the network to effect a change in the reactive power generated at the higher voltage.

47. A system as claimed in claim 44 wherein the network further comprises a transformer at the higher voltage, the transformer including a load tap changer, the network including transformer switch means for adjusting the load tap changer, and wherein the means for selectively transmitting a signal comprises means for selectively transmitting a signal to the transformer switch means to selectively adjust the load tap changer for lowering or raising the higher voltage.

48. A system as claimed in claim 44 wherein the network further comprises capacitor means at the lower voltage, and wherein the means for selectively transmitting a signal further comprises (1) means for determining the effect of decreasing the higher voltage by a predetermined amount on decreasing the voltages at the lower-voltage locations thereby permitting the capacitor means at the lower voltage to be switched into the network and (2) means for determining the reactive power made available by switching the capacitor means at the lower voltage into the network while maintaining the voltage at the lower-voltage locations within the predetermined voltage range.

49. A system as claimed in claim 44 wherein the network further comprises capacitor means at the lower-voltage locations, and means for changing the number of capacitor means in the network at different lower-voltage locations thereby to adjust the voltages at the lower-voltage locations and the amount of reactive power generated from the lower-voltage locations.

50. A system as claimed in claim 44 wherein controlling reactive power flow results in reducing energy losses in the network.

51. A system of controlling voltage and reactive power flow in a power transmission distribution network including power lines and transformer means for distributing power at a lower voltage, a intermediate voltage, and a higher voltage, power being distributed at the lower voltage to multiple lower-voltage locations, the network including, at the intermediate voltage, capacitor means and capacitor switch means for switching the capacitor means into or out of the network, the network further comprising voltage switch means for selectively lowering or raising the higher voltage, the system comprising:
   (a) means for measuring the voltage at one or more lower-voltage location,
   (b) first determining means for determining deviation, if any, of the measured voltage from a predetermined voltage range intended to be present at the lower-voltage location,
   (c) second determining means for determining whether switching the capacitor means into or out of the network changes the voltage deviation to bring the voltage at the measured lower-voltage location within the predetermined voltage range,
   (d) first means for selectively transmitting a signal to the capacitor switch means for switching the capacitor means into or out of operation in the network to effect a change in the voltage at the measured lower-voltage location,
   (e) means for measuring the reactive power flow at the higher voltage,
   (f) third determining means for determining whether a voltage change, within the predetermined voltage range, at said lower-voltage location causes capacitor means to switch into or out of the network,
   (g) means for ascertaining, with the proviso that the measured voltage is maintained within the predetermined voltage range, at least one of the following: (i) the available reactive power from available capacitor means not presently in the network or (ii) the removable reactive power at the higher voltage by switching the capacitor means presently in the network out of the network,
   (h) fourth determining means for determining the changes in reactive power resulting from the change of voltage, within the predetermined range, at said lower-voltage location, and
   (i) second means for selectively transmitting a signal to the voltage switch means, depending on reactive power availability or removability, and the measured reactive power flow, for lowering or raising the higher voltage to effect a change in the reactive power generated at the higher voltage, with the proviso that the lower voltage remains within the predetermined voltage range.

52. A system as claimed in claim 51 wherein the voltage measuring means further comprises means for measuring the voltage at multiple lower-voltage locations and wherein the second determining means comprises means for determining the effect of switching the capacitor means in and out of the network on the voltage at multiple lower-voltage locations, and wherein the first means for selectively transmitting a signal comprises means for selectively transmitting a signal to change the voltage at one or more lower-voltage locations while maintaining the voltage in the predetermined voltage range at one or more other lower-voltage locations.

53. A system as claimed in claim 51 wherein the network further comprises multiple service locations related to each lower-voltage location, and wherein the voltage measured at the lower-voltage location is representative of the voltages at the multiple service locations.

54. A system as claimed in claim 51 wherein the system further comprises (i) a voltage controller comprising means for transmitting a signal to the capacitor switch means, wherein the first means for selectively transmitting a signal transmits the signal from the voltage controller, and (ii) a reactive power controller comprising means for transmitting a signal to the voltage switch means, wherein the second means for selectively transmitting a signal transmits the signal from the reactive power controller,
   wherein the voltage controller and the reactive power controller are located remote from the lower-voltage locations.

55. A system as claimed in claim 51 wherein the network further comprises a distribution circuit at the intermediate voltage being selectively at a nominal voltage of about 4 kV to about 33 kV, and a subtransmission circuit at the higher voltage being selectively at a nominal voltage of about 66 kV to about 115 kV, and wherein the network further comprises means for switching the capacitor means into or out of the distribution circuit, and wherein the lower-voltage locations have a predetermined voltage range selectively between about 500 volts and 110 volts.

56. A system as claimed in claim 51 wherein controlling the voltage at the measured lower-voltage location results in reducing energy consumption at said lower-voltage location, and wherein controlling reactive power flow results in reducing energy losses in the network.

57. A system as claimed in claim 51, 52, or 53 wherein the capacitor means comprises multiple capacitor means and wherein the system further comprises a voltage controller comprising a voltage rise table, the voltage rise table providing information about the effect of switching the capacitor means on the voltage at the lower voltage locations, and wherein the second determining means further comprises means for using the voltage rise table to switch the capacitor means into or out of the network.

58. A voltage controller for controlling voltage in a power distribution network including power lines for distributing power at a lower voltage and at a higher voltage, power being distributed at the lower voltage to multiple lower-voltage locations, the network including, at the higher voltage, capacitor means and switch means for selectively switching the capacitor means into or out of the network, the voltage controller comprising:

(a) means for receiving a voltage measured at one or more lower-voltage location, (b) means for determining the deviation, if any, of the measured voltage from a predetermined voltage range intended to be present at the measured lower-voltage location, (c) means for determining whether switching the capacitor means into or out of the network changes the voltage deviation to bring the voltage at the measured lower-voltage location within the predetermined voltage range, and (d) means for selectively transmitting a signal to the switch means for switching the capacitor means into or out of operation in the network to effect a change in the voltage at the measured lower-voltage location.

59. A voltage controller as claimed in claim 58 further comprising means for changing the first lower voltage at one or more lower-voltage locations while maintaining the voltage in a predetermined voltage range at one or more other lower-voltage locations.

60. A voltage controller as claimed in claim 58 further comprising means for maintaining the voltage at the lower-voltage location close to a minimum level of the predetermined voltage range.

61. A voltage controller as claimed in claim 59 wherein the capacitor means comprises multiple capacitor means and wherein the voltage controller further comprises a voltage rise table, the voltage rise table providing information about the effect of switching the capacitor means into or out of the network on the voltage at the lower voltage locations, and wherein the determining means further comprises means for using the voltage rise table to switch the capacitor means into or out of the network.

62. A reactive power controller for controlling reactive power flow in a power transmission and distribution network including power lines and transformer means for distributing power at a lower voltage and at a higher voltage, power being distributed to multiple lower-voltage locations at the lower voltage, the network including capacitor means at the higher voltage and switch means for selectively switching the capacitor means into or out of the network, the system comprising:

(a) means for receiving a voltage measured at one or more lower-voltage location, (b) means for receiving a reactive power flow measured at the higher voltage, (c) means for determining whether a change of the measured voltage, within a predetermined voltage range, at said lower-voltage location causes the capacitor means to switch into or out of the network, (d) means for ascertaining, with the proviso that the measured voltage is maintained within the predetermined voltage range, at least one of the following: (i) the available reactive power from available capacitor means not presently in the network or (ii) the removable reactive power at the higher voltage by switching the capacitor means presently in the network out of the network, (e) means for determining the changes in reactive power resulting from the change of voltage, within the predetermined range, at said lower-voltage location, and (f) means for selectively transmitting a signal to the switch means, depending on reactive power availability or removability, and the measured reactive power flow, for lowering or raising the higher voltage to effect a change in the reactive power generated at the higher voltage with the proviso that the lower voltage remains within the predetermined voltage range.

63. An apparatus for controlling voltage and reactive power flow in a power transmission distribution network including power lines and transformer means for distributing power at a lower voltage, an intermediate voltage, and a higher voltage, power being distributed at the lower voltage to multiple lower-voltage locations, the network including capacitor means at the intermediate voltage and capacitor switch means for switching the capacitor means into or out of the network, the network further comprising voltage switch means for selectively lowering or raising the higher voltage, the apparatus comprising:

(a) means for receiving a voltage measured at one or more lower-voltage location, (b) means for determining the deviation, if any, of the measured voltage from a predetermined voltage range intended to be present at the measured lower-voltage location, (c) means for determining whether switching the capacitor means into or out of the network changes the voltage deviation to bring the first voltage at the measured lower-voltage location within the predetermined voltage range, and (d) means for selectively transmitting a signal to the capacitor switch means for switching the capacitor means into or out of operation in the network to effect a change in the lower voltage at the measured lower-voltage location, (e) means for receiving a reactive power flow measured at the higher voltage, (f) means for determining whether a change of the measured voltage, within the predetermined voltage range, at said lower-voltage location causes the capacitor means to switch into or out of the network, (g) means for ascertaining, with the proviso that the measured voltage is maintained within the predetermined voltage range, at least one of the following: (i) the available reactive power from available capacitor means not presently in the network or (ii) the removable reactive power at the higher voltage by switching the capacitor means presently in the network out of the network, (h) means for determining the changes in reactive power resulting from the change of voltage, within the predetermined range, at said lower-voltage location, and (i) means for selectively transmitting a signal to the voltage switch means, depending on reactive power availability or removability, and the measured reactive power flow, for lowering or raising the higher voltage to effect a change in the reactive power generated at the higher voltage, with the proviso that the first lower voltage remains within the predetermined voltage range.

64. The method of claim 1, 11, or 19 wherein the step of measuring comprises: (i) measuring the voltage at a plurality of lower-voltage locations, and (ii) statistically converting the measured voltages to a representative voltage.

65. The method of claim 64 wherein converting the measured voltages comprises averaging the measured voltages.

66. A method as claimed in claim 8 or 23 wherein the network further comprises multiple distribution circuits at the higher voltage, and wherein power is distributed from the distribution circuits to multiple lower-voltage locations.

67. The system of claim 34, 44, or 51 wherein the measuring means comprises: (i) means for measuring the voltage at a plurality of lower-voltage locations, and (ii) means for statistically converting the measured voltages to a representative voltage.

68. The system of claim 67 wherein the conversion means averages the measured voltages.

69. The system of claim 36 or 55 wherein the network further comprises multiple distribution circuits at the higher voltage, and wherein power is distributed from the distribution circuits to multiple lower-voltage locations.

70. A method for controlled reactive power flow in a power transmission and distribution network including power lines and transformer means for distributing power at a lower voltage and at a higher voltage, power being distributed at the lower voltage to multiple lower-voltage locations, the network including, at the higher voltage, capacitor means and switch means for selectively switching the capacitor means into or out of the network, the method comprising the steps of:
 (a) measuring the voltage at one or more lower-voltage location,
 (b) measuring the reactive power flow at the higher voltage, and upstream of the higher voltage,
 (c) determining:
   (1) whether a change of the measured voltage, within a predetermined voltage range, at said lower-voltage location causes the capacitor means to switch into or out of the network,
   (2) the change in reactive power resulting from a change of voltage, within the predetermined range, at said lower-voltage location,
   (3) with the proviso that the measured voltage is maintained within the predetermined voltage range, at least one of the following: (i) the available reactive power from available capacitor means not presently in the network, or (ii) the removable reactive power at the higher voltage by switching capacitor means presently in the network out of the network, and
 (d) depending on the reactive power availability or removability, and the measured reactive power flows, selectively transmitting a signal to the switch means for switching the capacitor means in or out of the network to effect a change in the reactive power generated at the higher voltage, with the proviso that the lower voltage remains within the predetermined voltage range.

71. A method as claimed in claim 70 wherein the network further comprises a voltage controller associated with the lower-voltage location to be measured, the voltage controller having information about (i) the voltage at the lower-voltage location, and (ii) capacitor means available to be switched into or out of the network, and wherein the step of measuring the voltage includes obtaining the voltage from the voltage controller, and wherein the determining steps b(3)(i) and b(3)(ii) include obtaining information from the voltage controller about capacitor means available to be switched into or out of the network.

72. A method as claimed in claim 70 wherein the step of measuring the voltage comprises measuring the voltage at a plurality of lower-voltage locations.

73. A method as claimed in claim 70 wherein the network further comprises a transformer at the higher voltage, the transformer including a load tap changer, the network including transformer switch means for adjusting the load tap changer, and wherein the step of selectively transmitting a signal comprises selectively transmitting a signal to the transformer switch means to selectively adjust the load tap changer for lowering or raising the higher voltage.

74. A system for controlling reactive power flow in a power transmission and distribution network including power lines and transformer means for distributing power at a lower voltage and at a higher voltage, power being distributed to multiple lower-voltage locations at the lower voltage, the network including, at the higher voltage, capacitor means and switch means for selectively switching the capacitor means into or out of the network, the system comprising:
 (a) means for measuring the voltage at one or more lower-voltage location,
 (b) means for measuring the reactive power flow at the higher voltage, and upstream of the higher voltage,
 (c) means for determining whether a voltage change at the lower-voltage location causes the capacitor means to switch into or out of the network while maintaining the measured voltage within a predetermined voltage range,
 (d) ascertaining, with the proviso that the measured voltage is maintained within the predetermined voltage range, at least one of the following: (i) the available reactive power from available capacitor means not presently in the network or (ii) the removable reactive power at the higher voltage by switching the capacitor means presently in the network out of the network,
 (e) means for determining the changes in reactive power resulting from the change of voltage, within the predetermined range, at said lower-voltage location, and
 (f) means for selectively transmitting a signal to the switch means, depending on reactive power availability or removability, and the measured reactive power flows, for lowering or raising the higher voltage to effect a change in the reactive power generated at the higher voltage, with the proviso that the measured voltage remains within the predetermined voltage range.

75. A system as claimed in claim 74 wherein the system further comprises a voltage controller associated with the lower-voltage location to be measured, the voltage controller having information about (i) the voltage at the lower-voltage location, and (ii) capacitor means available to be switched into or out of the network, and wherein the means for measuring the voltage obtains the voltage at the lower-voltage location from the voltage controller, and wherein the ascertaining means further comprises means for obtaining information from the voltage controller about the capacitor means.

76. A system as claimed in claim 75 wherein the network further comprises a transformer at the higher voltage, the transformer including a load tap changer, the network including transformer switch means for adjusting the load tap changer, and wherein the means for selectively transmitting a signal comprises means for selectively transmitting a signal to the transformer switch means to selectively adjust the load tap changer for lowering or raising the higher voltage.

* * * * *